United States Patent [19]

Kong

[11] Patent Number: 4,793,452

[45] Date of Patent: Dec. 27, 1988

[54] PISTON-CYLINDER TYPE OIL DAMPER

[75] Inventor: Alan Kong, Yokohama, Japan

[73] Assignee: Nifco, Inc., Yokohama, Japan

[21] Appl. No.: 65,448

[22] Filed: Jun. 23, 1987

[30] Foreign Application Priority Data

Jun. 27, 1986 [JP] Japan .................................. 61-149490

[51] Int. Cl.$^4$ ............................................. F16F 9/342
[52] U.S. Cl. .................... 188/317; 188/322.15
[58] Field of Search ............... 188/282, 316, 317, 318, 188/322.13, 322.15, 322.22, 322.5

[56] References Cited

U.S. PATENT DOCUMENTS

| 2,397,640 | 4/1946 | Bingham | 188/317 |
| 3,865,356 | 2/1975 | Wossner | 188/317 X |
| 4,433,759 | 2/1984 | Ichinose | 188/322.15 X |
| 4,632,228 | 12/1986 | Oster et al. | 188/322.15 X |

Primary Examiner—Duane A. Reger
Attorney, Agent, or Firm—Schwartz & Weinrieb

[57] ABSTRACT

A piston-cylinder type oil damper includes a cylinder containing oil, a piston inserted within the cylinder for dividing the interior of the cylinder into a head chamber and a rod chamber, a rod passing through the rod chamber and projecting out of a rod end of the cylinder, a cover slidably penetrated by the rod and closing the rod end, and a floating piston inserted within the head or rod chamber so as to form an air chamber. The piston is provided with axial through-holes for causing the oil within the head and rod chambers to flow therethrough in opposite directions. The rod is provided with an axially movable valve plate brought into contact with one side of the piston for partially shielding the through-holes.

20 Claims, 5 Drawing Sheets

PISTON-CYLINDER TYPE OIL DAMPER

FIELD OF THE INVENTION

This invention relates to a piston-cylinder type oil damper and, more particularly, to a piston-cylinder type oil damper, which serves to brake the door of a glove compartment in the passenger compartment of a car such that it opens smoothly instead of falling open suddenly under its own weight and the weight of accommodated articles or to brake the disk loading table of a compact disk player or the like so as to prevent it from being pulled or pushed rapidly out of the player by means of a spring, but which nevertheless permits the door or table to be returned to the initial state without the need for extra power.

BACKGROUND OF THE INVENTION

As a piston-cylinder type damper of this type, one based on pneumatic action is proposed in Japanese patent Public Disclosure No. SHO 58-174038.

In this damper, the piston rod is elongated with respect to the cylinder when the loading table projects out of the player. Also, the negative pressure produced in the head chamber in the cylinder is used to control the quantity of air taken into the chamber, thus effecting braking by means of the action of the negative pressure. Furthermore, when returning the open door or the projected table, the piston rod is pushed into the cylinder, so that air in the head chamber of the cylinder is quickly exhausted to the outside when the piston rod is pushed.

In the above piston-cylinder type air damper, when the maximum volume of the head chamber of the cylinder is constant and the flow rate of air taken into the head chamber at the time of the elongation of the piston rod is constant, the braking power is constant, so that it is impossible to vary the size of the braking force depending upon the purpose of use.

Therefore, it is necessary to control the diameter of the cylinder or the rate of flow of the air taken into the head chamber at the time of the elongation of the piston rod depending upon the use, and the design has to be altered for each purpose.

OBJECT OF THE INVENTION

An object of the invention is to provide a piston-cylinder type oil damper, which permits the braking force to be set at predetermined values by using oils of different viscosities within the cylinder.

SUMMARY OF THE INVENTION

According to the invention, there is provided a piston-cylinder type oil damper, which comprises a cylinder containing oil, a piston inserted within the cylinder for dividing the interior of the cylinder into a head chamber and a rod chamber, a rod passing through the rod chamber and projecting out of a rod end of the cylinder, a cover slidably penetrated by the rod and closing the rod end of the cylinder, and a floating piston inserted in the head chamber or rod chamber of the cylinder and urged against the piston so as to form an air chamber within the head chamber or rod chamber, the piston being provided with an axial through-hole for permitting flow therethrough of oil within the head and rod chambers in opposite directions, the rod being provided with an axially movable valve plate for shielding a portion of the through-hole in contact with one side of the piston.

The valve plate shields some of the through-holes of the piston in contact therewith from the side of the head chamber or rod chamber. Assuming that the valve plate is brought into contact with the piston from the side of the head chamber, in a contraction stroke of forcing the rod of the piston into the cylinder the valve plate is urged by means of the oil within the head chamber and brought into contact with the piston so as to shield some of the through-holes of the piston. In this way, the rate of flow of oil within the head chamber and flowing into the rod chamber through means of the through-holes is restricted so as to obtain a braking action. On the other hand, in an elongation stroke in which the rod of the piston is pulled out from the cylinder, oil within the rod chamber is caused to flow through the through-holes of the piston so as to push the valve plate axially and separate the valve plate from the piston. Thus, the oil is moved to the head chamber by making use of all the areas of the through-holes, so that the rod is smoothly elongated. The braking action is varied by means of the viscosity of the oil within the cylinder, and the greater the viscosity, the greater the braking force obtained. When the valve plate is brought into contact with the piston from the side of the rod chamber, a braking action is produced in an elongation stroke.

The sum of the volumes of the head and rod chambers, between which oil flows in opposite directions through means of an axial through-hole within the piston is different when the rod is elongated and contracted. When the rod is contracted, the sum is reduced to the extent that the space of the rod chamber is occupied by means of the rod. When the rod is elongated, on the other hand, the sum is increased. For this reason, a floating piston is inserted within the head chamber or rod chamber so as to form an air chamber, and the floating piston is biased toward the piston of the rod. Therefore, when the rod undergoes a contraction stroke, the floating piston is urged by means of the oil against the biasing force, thus reducing the volume of the air chamber. On the other hand, when the rod undergoes an elongation stroke, the floating piston is moved toward the piston of the rod by means of the biasing force, thus increasing the volume of the air chamber. In this way, changes in the sum of the head and rod chamber volumes, which varies with the elongation and contraction of the rod, are absorbed by means of changes in the volume of the air chamber due to the movement of the floating piston.

The floating piston and air chamber can also absorb an expansion of the oil due to an increase in the ambient temperature of the cylinder and can also absorb a contraction of the oil due to a decrease in the ambient temperature.

BRIEF DESCRIPTION OF THE DRAWINGS

The above and other objects and features of the invention will become more apparent from the following detailed description with reference being made to the accompanying drawings, wherein.

DETAILED DESCRIPTION OF THE PREFERRED EMBODIMENTS

FIGS. 1 to 7 show a first embodiment of the oil damper according to the invention. Reference numeral 1 designates a cylinder, in which oil 2, for example, silicone oil, is received, and which has a head end 1a. Reference numeral 3 designates a rod, which is provided with a piston 4 for dividing the interior of the cylinder into a head chamber 5 and a rod chamber 6. The volume of one of these chambers is reduced when the volume of the other is increased. The cylinder 1, rod 3 and piston 4 are respective plastic moldings. The rod end of the cylinder is closed by means of a cover 7 which is slidably penetrated by the rod 3.

Figure 1:
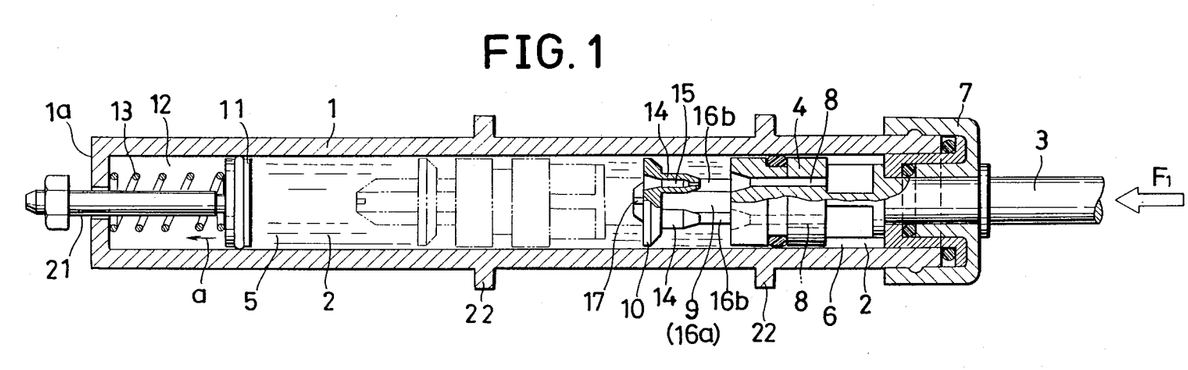
FIG. 1 is a sectional view showing a first embodiment of the oil damper according to the invention during a contraction stroke of the rod.
Figure 2:
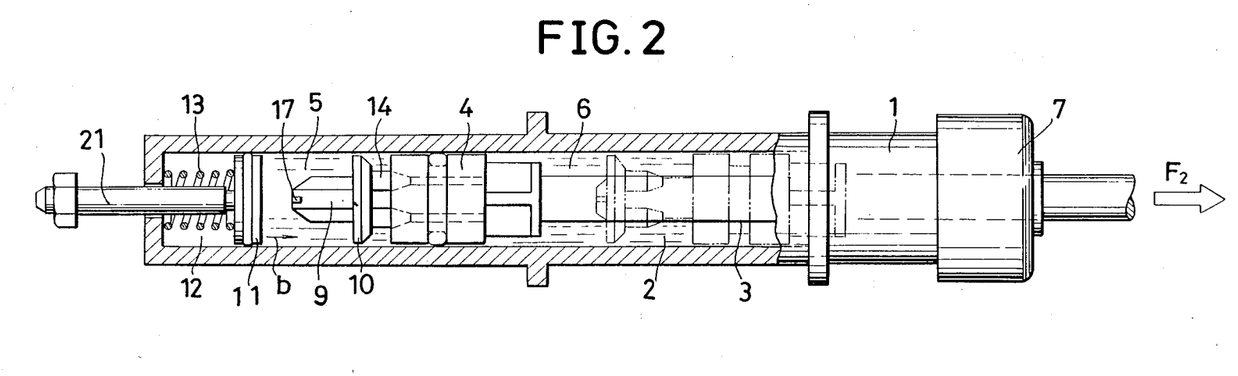
FIG. 2 is a sectional view showing the oil damper of FIG. 1 during an elongation stroke of the rod.
Figure 3:
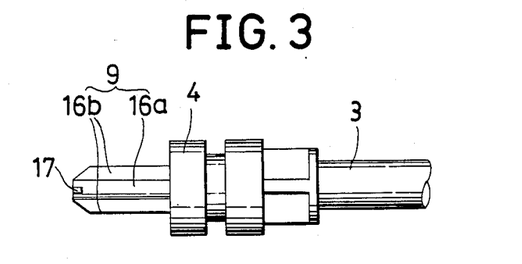
FIG. 3 is a side view showing the rod of the oil damper of FIG. 1.
Figure 4:
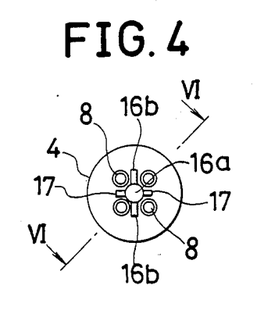
FIG. 4 is a plan view showing the rod of FIG. 3.
Figure 5:
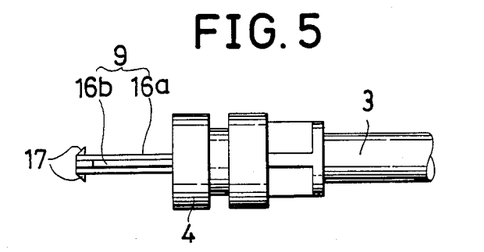
FIG. 5 is a front view showing the rod of FIG. 3 viewed from the left side.
Figure 6:
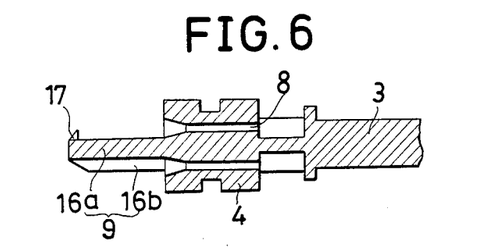
FIG. 6 is a sectional view taken along line VI—VI in FIG. 4.
Figure 7:
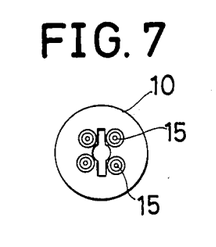
FIG. 7 is a front view showing the valve plate of the oil damper shown in FIG. 1 viewed from the left.

The piston 4 has a set of axial through-holes 8, through which oil flows back and forth between the head chamber 5 and rod chamber 6. In this embodiment, the rod 3 has a shaft 9 extending from the center of the piston 4. A valve plate 10 is mounted upon the end of shaft 9 so as to be axially movable between a first position illustrated in full lines at which the valve plate 10 is separated from the piston 4, and a second position illustrated in dotted lines at which the valve plate 10 partially shields the through-holes 8 as a result of being in contact with the head chamber side of piston 4. In order to prevent rotation of the valve plate upon the shaft 9, the shaft 9 and a center hole of the valve plate 10 penetrated by it are given a shape other than a circle. The end of the shaft 9 is provided with suitable means for preventing detachment of the valve plate 10.

Reference numeral 11 designates a floating piston, numeral 12 an air chamber, and numeral 13 a spring biasing the floating piston 11 toward the piston 4.

In the first embodiment shown in FIGS. 1 to 7, the floating piston 11 is inserted into the head chamber 5 so as to form an air chamber 12 within the head chamber 5. The piston 4 has four through-holes 8 uniformly spaced apart in the circumferential direction and each having a diameter of 1.5 mm. Each through-hole 8 has a flared end at the head chamber side thereof. The valve plate 10 is provided as means for partially shielding the through-holes and upon the surface thereof facing the piston 4 there is provided projecting cylinders or plugs 14 which correspond in position to the through-holes 8 and which have tapered ends. Each projecting cylinder 14 of the valve plate 10 has a series of axial through-holes 15 with a minimum inner diameter of 0.5 mm.

The shaft 9 extending from the center of the piston 4 has a circular central section 16a and two side sections 16b projecting from diametrically opposite portions of the central section 16a. From the end of the central section 16a two diametrically opposite pawls or tangs 17 project radially outwardly with each one being spaced 90° from one of the side sections 16b. When the valve plate 10 is mounted upon the shaft 9 from the end thereof and the check pawls 17 are deformed, it is retained by means of the check pawls 17 so that it will not become detached from the shaft 9 in the opposite direction.

In the first embodiment, in the elongated state of the rod as shown by the solid lines in FIG. 1, oil 2 fills the space between the floating piston 11 in the cylinder 1 and the cover 7. When a leftward acting force F1 tending to force the rod 3 into the cylinder 1 is applied as shown in FIG. 1, in which the rod 3 is shown to be projected to the utmost from the cylinder end of the cylinder 1, the rod 3 is first moved slightly to the left together with the piston 4, and the projecting cylinders 14 of the valve plate 10 are inserted into the tapered sections of the through-holes 8 of the piston. As a result, oil in the head chamber 5 cannot flow into the rod chamber 6 through means of the through-holes 8 without passing through the narrow throttled holes 15 with a minimum inner diameter of 0.5 mm as shown by means of the broken lines in FIG. 1. Therefore, the contraction stroke of the rod 3 caused by the force F1 from the right is braked, and the magnitude of the braking force is determined by means of the viscosity of the oil 2 which has to pass through the throttled holes 15 insofar as the sectional area of the minimum diameter section of the throttled holes is constant.

During the contraction stroke of the rod, the volume of the interior of the cylinder is reduced to the extent that the rod 3 enters the rod chamber 6, and the corresponding amount of the oil within the rod chamber flows through the throttled holes 15 into the head chamber. Consequently, the floating piston 11 reduces the air chamber 12 as a result of movement against the biasing force of the spring 13 and moves toward the head side end 1a of the cylinder (as shown by arrow a) to the state shown by means of the solid lines in FIG. 2. The movement in this direction also takes place when oil undergoes volume expansion with an increase of the temperature outside of the cylinder. When a rightward pulling force F2 is applied to the rod 3 having been contracted with the piston 4 and valve plate 10 (FIG. 2), oil in the rod chamber flows into the through-holes 8 of the piston, and part of it flows into the throttled holes 15 of the valve plate. The rest of the oil acts upon the free end surface of the projecting cylinders 14 so as to bias the valve plate in order to separate the piston 4 from the valve plate. Consequently, the rod is elongated without being braked (see broken lines in FIG. 2). During this elongation stroke, the rod 3 of the piston 4 progressively leaves the rod chamber 6, so that the volume of the rod chamber is progressively increased. Therefore, the floating piston 11 is moved through the head chamber so as to follow the piston 4 by means of the restoring force of the spring 13 (arrow b). The oil in the rod chamber is forced through the through-holes 8 into the head chamber so as to increase the volume of the air chamber 12 (as shown by the solid lines in FIG. 1). The movement of the floating piston in this direction is also caused when the volume of the oil 2 is reduced as a result of a reduction of the temperature outside the cylinder.

In the second embodiment shown in FIGS. 8 to 12, the piston 4 has, as through-holes 8, two holes 8a having a large sectional area and two holes 8b having a small sectional area. The shaft 9 has a shape like that of a key hole with an integral key. The valve plate 10 which is axially movable along the shaft 9 has a substantially lobe configuration which includes notches 18 corresponding in position to the small holes 8b and closes large holes 8a when it comes into contact with the piston. This means that the surface of the valve plate 10 which closes the large holes 8a constitutes a means for shielding a part of the through-holes. The valve plate 10 is retained by means of an E- or C-shaped elastic ring 19 fitted upon the end of the shaft 9 so that it is prevented from being detached from the shaft.

Figure 8:
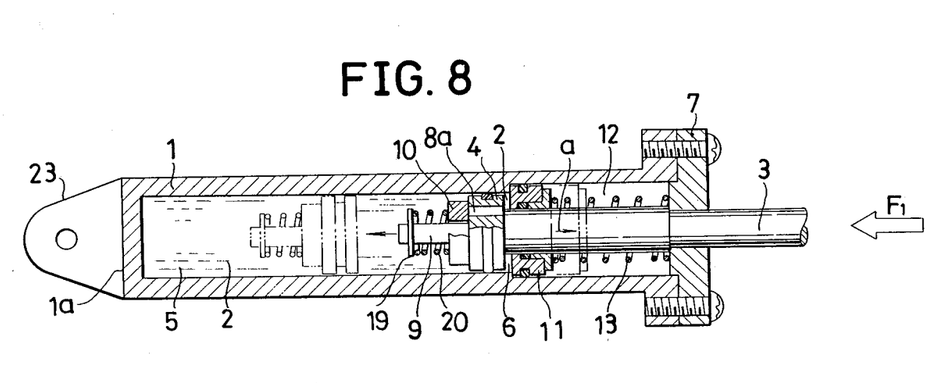
FIG. 8 is a sectional view showing a second embodiment of the oil damper according to the invention when the rod undergoes a contraction stroke.
Figure 9:
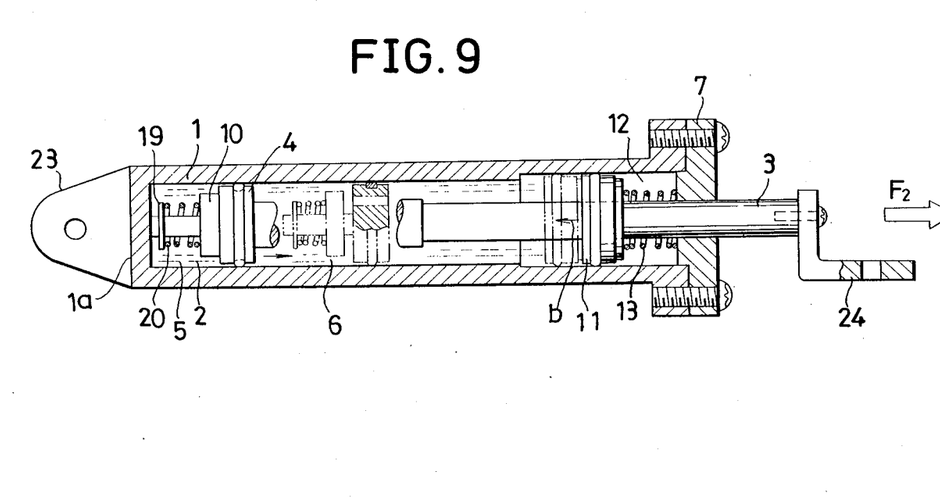
FIG. 9 is a sectional view showing the oil damper shown in FIG. 8 during an elongation stroke of the rod.
Figure 10:
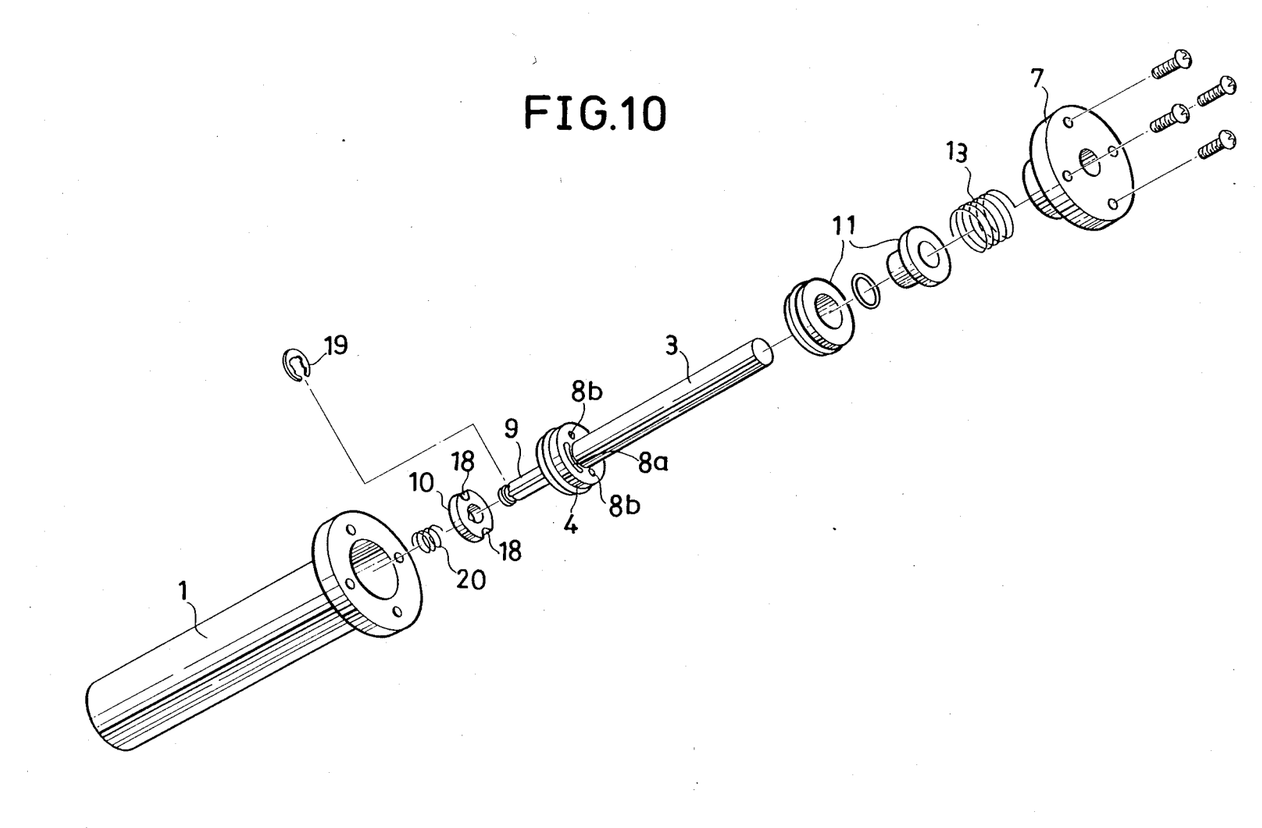
FIG. 10 is an exploded perspective view showing the oil damper of FIG. 8.
Figure 11:
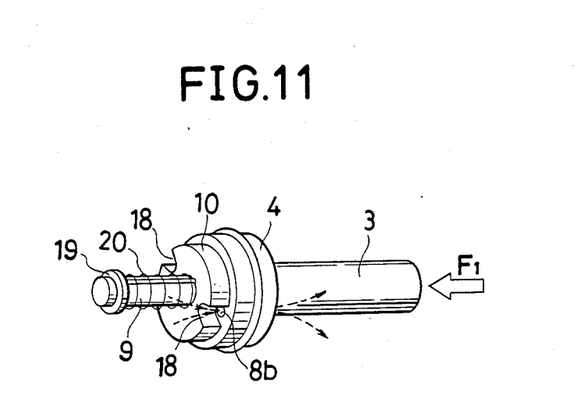
FIG. 11 is a view for explaining the operation of the valve plate when the rod undergoes the contraction stroke.
Figure 12:
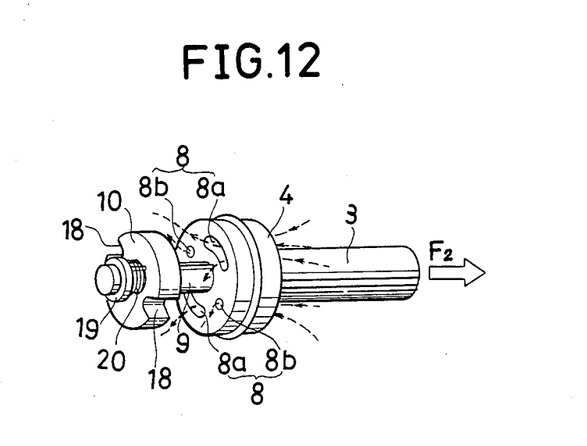
FIG. 12 is a view for explaining the operation of the valve plate when the rod undergoes the elongation stroke.

In this embodiment, the floating piston 11 through which the rod 3 slidable penetrates in a water-tight manner, is inserted into the rod chamber 6 so as to form an air chamber 12 between the floating piston 11 and cover 7. In addition, the floating piston 11 is urged toward the piston 4 by means of a spring 13 provided between an insert (not numbered) of piston 11 and the cover 7 and disposed coaxially about the rod 3. Oil 2 fills the space between the head end 1a of the cylinder and the floating piston 11 in the rod chamber.

When the rod 3 in the elongated state is contracted by means of a leftwardly directed force F1 (FIG. 8), the valve plate 10 is brought into contact with the piston 4 so as to close the large through-holes 8a by means of the oil within the head chamber (see FIG. 11), and the oil within the head chamber can flow into the rod chamber 6 only through the small through-holes 8b which are not closed by means of the valve plate. Thus, the contraction stroke of the rod is braked upon the basis of the cross sectional area of the small holes 8b and the viscosity of oil 2. In this case, as the piston 4 is forced toward the left, the rod 3 enters into the space between the piston 4 and the floating piston 11 which is filled with oil 2, thus reducing the volume of the space. Thus, the floating piston 11 compresses the spring 13 and is moved through the rod chamber toward the rod end of the cylinder (arrow a), thus reducing the volume of the air chamber 12 (as shown by solid lines in FIG. 9).

With a rightward pulling force F2 is applied to the rod within the contracted state (FIG. 9), oil in the rod chamber 6 acts upon the valve plate 10 means of the large through-holes 8a so as to urge the valve plate toward the left and thereby separate the valve plate from the piston. Thus, the oil within the rod chamber flows into the head chamber 5 through means of both the large and small holes 8a and 8b (see FIG. 12), so that the rod 3 is elongated without being braked. In this case, as the piston 4 approaches the floating piston 11, the floating piston is urged by means of the spring 13, causing it to approach the piston 4 (arrow b) so as to increase the volume of the air chamber 12.

When the oil 2 undergoes volume expansion due to high temperature outside the cylinder, the floating piston 11 compresses the spring 13 so as to absorb the expansion of the oil. When the temperature is reduced, the floating piston 11 is urged toward the left by means of the spring 13. In this way, it is moved to follow the volume of the oil.

In this embodiment, a spring 20 for biasing the valve plate 10 toward the piston 4 is fitted upon the shaft 9 between the elastic ring 19 fitted upon the end of the shaft 9 and valve plate 10. Thus, the valve plate having been separated from the piston in the elongation stroke of the rod is urged, when the rod is held in the elongated state, by means of the spring 20 so as to be brought into contact with the piston in order to close the large through-holes 8a. Thus, it is possible to prevent a momentary last motion of the rod in the elongated state until piston 4 is brought into contact with the valve plate 10 in an initial stage of the contraction stroke. When the rod in the contracted state undergoes the elongation stroke, the valve plate is momentarily separated from the piston against the biasing force of spring 20 by means of the oil acting through the large through-holes 8a. Thus, no braking is applied in the initial stage of the elongation stroke.

Furthermore, in the above two embodiments the valve plate 10 is brought into contact with the piston 4 from the side of the head chamber. However, it is possible to make the valve plate 10 movable along the rod 3 in its axial direction so as to be brought into contact with the piston from the side of the rod chamber in order to brake the elongation stroke of the rod.

The cylinder 1 and rod 3 are provided with suitable connecting means for connection between the vehicle body and the glove compartment door or between the disk loading table and the compact disk player body.

In the first embodiment, the floating piston 11 has a stem 21 slidably penetrating the head end 1a of the cylinder, and it is difficult to provide a bracket or the like at the head end. Therefore, a connection band is wound upon the outer periphery of the cylinder between the two flange-like enlarged sections 22. In this respect, in the second embodiment, a bracket 23 is provided at the head end of the cylinder for establishing such connection. The rod 3 of the piston 4 may be provided with a bracket 24 as shown in FIG. 9.

According to the invention it is possible to provide a piston-cylinder type oil damper which enables adjustment of the braking force by varying the viscosity of the oil sealed within the cylinder. Oil, unlike air, is incompressible. Therefore, the speed of movement of the rod is substantially unchanged irrespective of changes in the force for moving the rod in the direction of braking (for example, F1 in the case of the embodiment). That is, the rod can be moved only substantially at a constant speed.

The floating piston is moved in the cylinder following the changes in volume of the head and rod chambers during the elongation and contraction strokes of the rod and thermal expansion of the oil in order to vary the volume of the compressible air chamber. Therefore, it is possible to use non-compressible oil without any problem in operation.

Obviously, many modifications and variations of the present invention are possible in light of the above teachings. It is therefore to be understood that within the scope of the appended claims, the present invention may be practiced otherwise than as specifically described herein.

What is claimed is:

1. A piston-cylinder type oil damper, comprising:
   a cylinder containing oil;
   a piston disposed within said cylinder for dividing the interior of said cylinder into a head chamber and a rod chamber, and provided with axial through-hole means for permitting said oil within said head chamber and said rod chamber to flow therethrough in opposite directions;

a piston rod passing through said rod chamber so as to have an intermediate portion thereof connected to said piston and a first proximal end thereof connected to a force generating means for moving said piston rod and said piston in opposite directions within said cylinder; and a valve plate axially movable upon a second distal end of said piston rod between a first position at which said valve plate is separated from said piston so as to entirely uncover said axial through-hole means in order to permit free flow of said oil therethrough between said rod chamber and said head chamber, and a second position at which said valve plate is brought into contact with one side of said piston so as to partially shield said axial through-hole means in order to define only partially reduced flow therethrough between said rod chamber and said head chamber.

2. An oil damper as set forth in claim 1, further comprising:

a floating piston disposed within said cylinder and defining with one end of said cylinder a compressible-expansible air chamber.

3. A piston-cylinder type oil damper according to claim 2, wherein said floating piston is accommodated in said head chamber in said cylinder and biased toward said piston.

4. A piston-cylinder type oil damper according to claim 2, wherein said floating piston is accommodated in said rod chamber in said cylinder and biased toward said piston.

5. A piston-cylinder type oil damper according to claim 1, wherein:

said movable valve plate is provided with at least one projecting plug cylinder which is fitted in said through-hole means so as to partially close said through-hole means.

6. A piston-cylinder type oil damper according to claim 5, wherein said at least one projecting cylinder has a throttled hole formed therein.

7. An oil damper as set forth in claim 2, further comprising:

spring biasing means disposed within said air chamber between said one end of said cylinder and said floating piston for biasing said floating piston away from said one end of said cylinder and toward said piston.

8. An oil damper as set forth in claim 1, further comprising:

cover means secured upon an end of said cylinder; and said piston rod is slidably disposed within said cylinder so as to pass through said cover means.

9. An oil damper as set forth in claim 2, further comprising:

cover means secured upon said one end of said cylinder; and said piston rod is slidably disposed within said cylinder so as to pass through said cover means.

10. An oil damper as set forth in claim 2, further comprising:

cover means secured upon a second opposite end of said cylinder; and said piston rod is slidably disposed within said cylinder so as to pass through said cover means.

11. An oil damper as set forth in claim 1, wherein:
said through-hole means comprises at least two different sized holes; and said valve plate has a lobe-shaped configuration for covering the larger sized holes when said valve plate is moved to said second position whereby said reduced flow through the smaller sized holes is achieved.

12. An oil damper as set forth in claim 1, wherein:
said valve plate is disposed upon said piston rod within said head chamber so as to be disposed upon the head chamber side of said piston.

13. An oil damper as set forth in claim 1, further comprising:

spline means defined between said piston rod and said valve plate for preventing relative rotation between said valve plate and said piston rod whereby proper alignment between said valve plate and said through-hole means of said piston is assured.

14. An oil damper as set forth in claim 1, further comprising:

key-keyway means defined between said piston rod and said valve plate for preventing relative rotation between said valve plate and said piston rod whereby proper alignment between said valve plate and said through-hole means of said piston is assured.

15. A piston-cylinder type damper, comprising:

a cylinder containing an incompressible fluid;

a piston disposed within said cylinder for dividing the interior of said cylinder into a head chamber and a rod chamber, and provided with axial through-hole means for permitting said incompressible fluid within said head chamber and said rod chamber to flow therethrough in opposite directions;

a piston rod passing through said rod chamber so as to have an intermediate portion thereof connected to said piston and a first proximal end thereof connected to a force generating means for moving said piston rod and said piston in opposite directions within said cylinder; and a valve plate axially movable upon a second distal end of said piston rod between a first position at which said valve plate is separated from said piston so as to entirely uncover said axial through-hole means in order to permit free flow of said incompressible fluid therethrough between said rod chamber and said head chamber, and a second position at which said valve plate is brought into contact with one side of said piston so as to partially cover said axial through-hole means in order to define only partially reduced fluid flow therethrough between said rod chamber and said head chamber.

16. A fluid damper as set forth in claim 15, further comprising:

a floating piston disposed within said cylinder and defining with one end of said cylinder a compressible-expansible air chamber.

17. A fluid damper as set forth in claim 16, wherein:
said floating piston is disposed within said head chamber.

18. A fluid damper as set forth in claim 16, wherein:
said floating piston is disposed within said rod chamber.

19. A fluid damper as set forth in claim 15, wherein:
said through-hole means comprises at least one through-hole having a predetermined size for defining a predetermined flow rate of said incompressible fluid therethrough; and said valve plate includes plug means, having a fluid passage defined therein of a predetermined size less than that of said through-hole means, for engaging said through-hole means, whereby only said partially reduced flow can be achieved through said plug means of said valve plate when said valve plate is disposed at said second position.

20. A fluid damper as set forth in claim 15, wherein: said through-hole means comprises at least two different sized holes; and said valve plate has a lobe-shaped configuration for covering the larger sized holes when said valve plate is disposed at said second position whereby said reduced flow is achieved through the uncovered smaller sized holes.

* * * * *